Patented Dec. 1, 1953

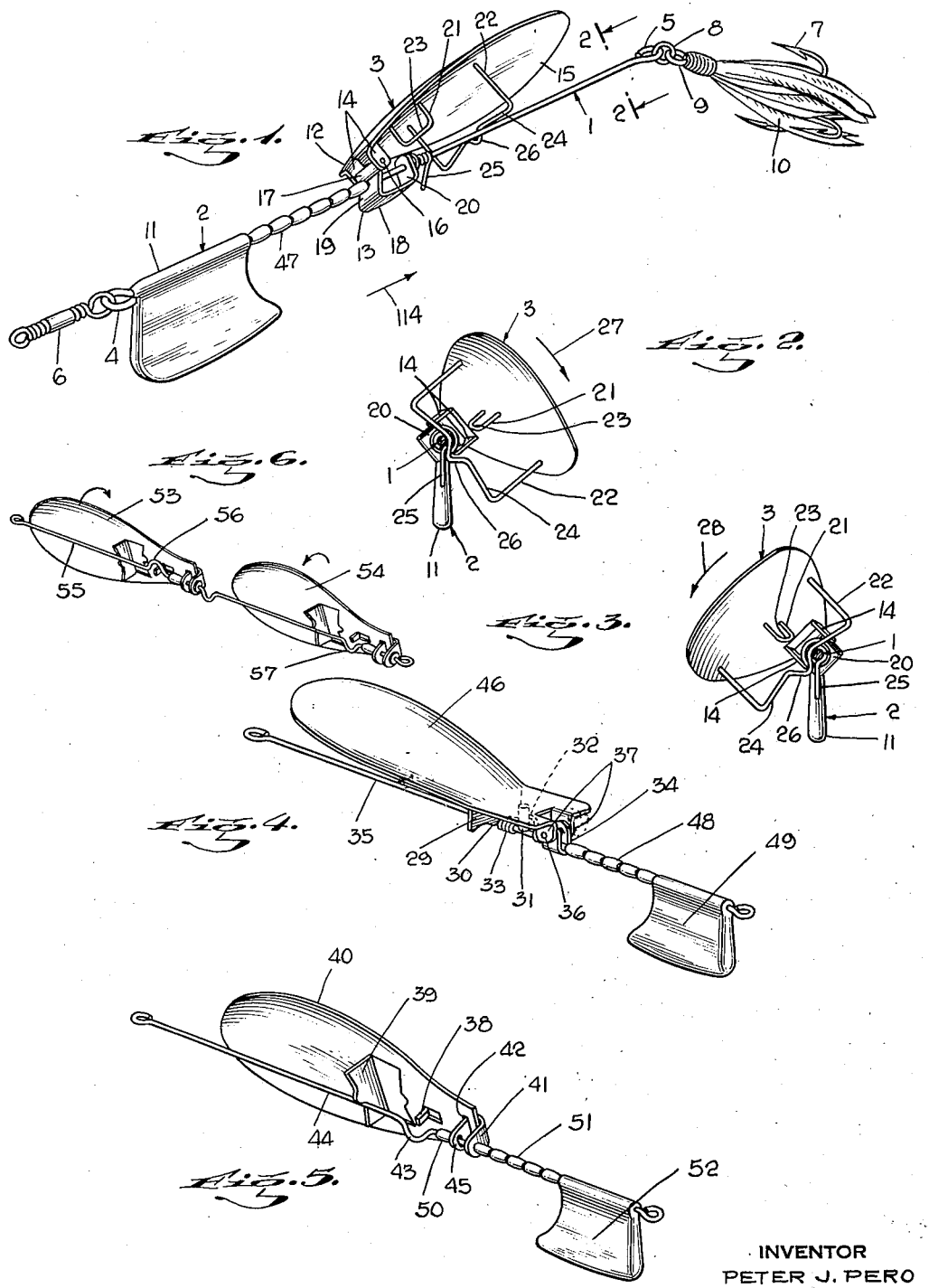

2,660,827

UNITED STATES PATENT OFFICE 2,660,827

FISH LURE

Peter J. Pero, Jersey City, N. J.; Josephine Pero and Peter P. Pero, executors of said Peter J. Pero, deceased, assignors to Josephine Pero, Jersey City, N. J.

Application April 27, 1951, Serial No. 223,364

11 Claims. (Cl. 43—42.19)

This invention relates to fish lures in general and more especially to movable fish lures.

Among the objects of the present invention it is aimed to provide an improved fish lure which has a rotatable element and mechanism for causing the rotatable element positively to oscillate, that is, first rotate in one direction and then rotate in the opposite direction.

These and other features, capabilities and advantages of the invention will appear from the subjoined detailed description of specific embodiments thereof illustrated in the accompanying drawings, in which Fig. 1 is a perspective of one embodiment of a fish lure made according to the present invention.

Fig. 2 is a section on the line 2—2 of Fig. 1.

Fig. 3 is a section similar to Fig. 2 but with the rotatable element positioned for rotation in a direction opposite to that of the rotatable element when positioned as shown in Fig. 2.

Fig. 4 is a perspective of the main part of the fish lure made according to a second embodiment.

Fig. 5 is a perspective of the main part of a fish lure made according to a third embodiment.

Fig. 6 is a perspective of the main part of a fish lure made according to a fourth embodiment.

In the embodiment shown in Figs. 1, 2 and 3, the main part of the fish lure there illustrated consists of a stem or spindle 1, a keel 2, and a movable element 3. The spindle 1 may be composed of wire or the like and have loops 4 and 5 formed at its ends, the loop 4 being connected to a line or to a swivel 6 as shown, and the loop 5 to be secured to a hook or multiple hook element, such as the multiple hook 7, by any suitable movable connection, such as the link 8, which connects the loop 5 with the loop 9 of the multiple hook 7. The multiple hook 7 may be decorated with any suitable camouflaging medium, such for instance as the feather 10.

The keel 2 constituting an important part of the present invention is fixed to the stem 1 against movement relative to the stem 1. The area and weight of the keel 2 will vary depending upon the tackle for which it is intended. If the tackle is intended for use with small game fish, such as fresh water trout or sea bass, excellent results have been achieved when the stem 1 is composed of twenty gauge steel wire or conventional piano wire about $\frac{1}{32}$ of an inch in diameter and about 3¼ inches in length, the area of the keel 2 when composed of lead or the like approximates ½ of an inch in width by about ⅝ of an inch in length adjacent the stem 1 and flaring outwardly to about ¾ of an inch in length at its free end with a thickness of about $\frac{1}{32}$ of an inch adjacent the stem 1 and flaring outwardly to a thickness of about $\frac{1}{16}$ of an inch adjacent its free end.

This keel 2, as shown, preferably is chambered at its narrow end 11 through which extends the stem 1.

The movable element 3 also may vary in shape and size without departing from the general spirit of the invention. With a stem 1 and keel 2 having the dimensions aforesaid, excellent results have been achieved when the movable element 3 consisted of a blade or vane slightly arcuate in cross section with its outer face convex, and pear-shaped in outer contour with its narrow end 12 pivotally connected to an anchor 13 rotatably mounted on the stem 1, the overall length about 1½ inches, the width at its wide portion about one inch and tapering inwardly to about ½ of an inch at the narrow end 12, and in thickness approximating $\frac{1}{64}$ of an inch, that of 24 gauge, composed of brass, copper, steel, or a plastic material, such as polyvinyl chloride, conventionally known as "Vinyl" or "Lucite" or the like.

The keel 2 in use especially when the lure is drawn through the water or immerged in a moving mass of water, will depend from the stem 1 while the blade 3 will, as a result of the forces exercised by the moving mass of water in the direction of the arrow 114 shown in Fig. 1, tend to raise the end of the stem 1 to which the hook member 7 is connected.

The mechanism now to be described for connecting the blade 3 to the stem 1 and for controlling its movement constitutes the main part of the present invention. The details of construction of this mechanism obviously may vary without departing from the general spirit of the invention. In the embodiment shown in Fig. 1, this mechanism is characterized by the lips 14 bent outwardly from the blade proper 15 of the blade 3 toward the stem 1, through which lips 14 extends the pivot pin 16 journalled in the bearing 17 of the U-shaped bracket 18 rotatably mounted on the stem 1, the stem 1 extending through the legs 19 and 20 of the U-shaped bracket 18. On the inner face of the blade proper 15, that is, the side facing the stem 1, there are formed two bridges or abutments, the U-shaped bridge 21 extending longitudinally of the blade proper 15 and the bridge 22 extending transversely of the blade proper 15. The bridge 21 is disposed between the bridge 22 and the lips 14, while the bridge 22 in the present instance is disposed about midway between the outer free end and the pivoted end of the blade proper 15. Both bridges 21 and 22 are substantially U-shaped and composed of wire in the present instance with the ends of their legs connected to the inner face of the blade proper 15.

The bridge 21 is preferably disposed in alinement with the longitudinal middle of the blade proper 15 and in the present instance its intermediate portion 23 is disposed nearer to the blade proper 15 than is the intermediate portion 24 of the bridge 22 being just long enough to extend in the path of movement of the trip, abutment, or stop finger 25, in the present instance consisting of the free stretch of a wire wrapped around and secured to the stem 1 adjacent the leg 20 of the bracket 18.

The intermediate portion 24 of the bridge 22, on the other hand, has a two-faced nose or distension 26 formed in the middle thereof, either face of which will engage the stem 1 as shown. When the left hand side of the nose 26, looking at Fig. 2, engages the stem 1, the blade 3 will rotate in clockwise direction, the direction of the arrow 27. On the other hand, when the right hand side of the nose 26, looking at Fig. 3, engages the stem 1, the blade 3 will rotate in a counter-clockwise direction, the direction of the arrow 28. Although the keel 2 and the finger 25 are fixedly secured to the stem 1, both against rotation and axial movement relative to the stem 1, the bracket 18 is rotatably mounted on the stem 1. To anchor the bracket 18 against slidable movement relative to the stem 1, spacing means, such as the beads 47, are mounted on the stem 1 intermediate the keel 2 and the free extension of the wire 25.

In operation, when the lure is cast through the air into the water, the force of the air will deflect the blade 3 toward the loop 5 where the bridge portion 24 engages the stem 1. In turn, after the lure enters the water, the force of the flowing mass of water in the direction of the arrow 114 will strike the outer convex face of the blade 3 and due to the pitch of the blade 3 relative to the stem 1, controlled by the nose 26, the blade 3 will start rotating either in a clockwise or a counter-clockwise direction, depending upon the position of the nose 26 relative to the stem 1. If the blade 3 is moving, as an instance in a clockwise direction, see Fig. 2, it will continue in this direction until the bridge 21 strikes the fin-25 when the nose 26, due to its inclined sides, cams over the stem 1 so that the other side of the nose 26 will engage the stem 1, when due to the change of pitch of the blade 3, relative to the stem 1, the blade 3 will then reverse its rotation in the direction of the arrow 28, see Fig. 3, and continue rotating in such direction until the pin 25 again engages the bridge 21 and again initiates the reversal of rotation. This oscillation will continue and be positively controlled so long as the lure and the mass of water are moving relative to one another, that is, so that the force of the mass of water will be in the direction of the arrow 114 against the outer convex face of the blade 3. For this reason, the outer convex face of the blade 3 must of course be tilted outwardly relative to the stem 1 so that it will be exposed to the force of the water indicated by the arrow 114.

The embodiment shown in Fig. 4 differs from the embodiment shown in Fig. 1 primarily in that the bridge 22 is replaced by a plate 29 having a nose 30 extending from the outer free edge thereof, that the bridge 21 is replaced by the pin 31, the finger 25 is replaced by a loop 32 formed in the wire 33 and the bracket 18 is replaced by the bracket 34 looped around the stem 35, and the pin 36 extends through the legs of the bracket 34 to connect them to the lips 37.

The embodiment shown in Fig. 5 in turn differs from the embodiment shown in Fig. 1 in that the bridges 21 and 22 are replaced by the projection 38, and the plate 39, respectively, stamped out of the blade 40, the pivotal connection with the stem 1 is replaced by the U-shaped bracket 41 which extends through a slot 42 formed in the blade 40, and the pin 25 is replaced by a loop or nose 43 bent in the stem 44.

In all three embodiments it will of course be apparent that sufficient clearance must be provided between the pivotal connection of the blade 3, 40, and 40 relative to the stem 1, 35 and 44, respectively, to enable the blade to be deflected from side to side to change its pitch from one side to the other of the stem. As an instance, in the embodiment of Fig. 1 at least the opening in the leg 19 must allow for such movement, in the embodiment of Fig. 2 clearance between the stem 35 and the sides of the bracket 34 must allow for such movement, and in the embodiment of Fig. 4 at least the opening in the leg 45 of the bracket 41 must be large enough to allow for such movement.

Instead of the hook member 7 shown, it is obvious, without departing from the general spirit of the invention, to substitute devices containing hooks such as live bait, plugs, or the like used with any of the so-called deep-diving lures.

In turn the movable element 3 may be colored either in one color or a combination of colors.

Furthermore, it is of course understood that the keel will counteract or tend to counteract or prevent the blade 3 to transmit its motion to the spindle 1, thereby in turn to cause the spindle 1 and blade 3 to revolve constantly in one direction. The keel 2 thus acts as a brake for two reasons, one due to its weight, and two due to the resistance offered by its face to the water, whereby the two resisting forces combine to counteract the torque transmitted to the spindle 1 when the intermediate portion 23 of the bridge 21 strikes the trip 25 during rotation of the blade 3. It is the resistance of the keel 2 at this point of contact between the bridge 23 and trip 25, together with the momentum of the blade 3 created during its rotation on the spindle 1 that causes the spindle 1 to hop from one face of the nose 26 to the other face of the same, thereby changing the angle of the blade 3 with relation to the spindle 1, and causing the blade 3 to start its motion in the opposite direction.

Although beads 47 have been shown intermediate the bracket 18 and the keel 2 of the embodiment illustrated in Fig. 1, and beads 48 intermediate the bracket 34 and the keel 49 of the embodiment illustrated in Fig. 4, and a bead 50 between the bracket 41 and the nose 43, and the beads 51 intermediate the bracket 41 and the keel 52 of the embodiment shown in Fig. 5, any other spacing means may of course be provided instead of these beads, without departing from the general spirit of the invention.

The embodiment illustrated in Fig. 6 differs from the embodiment illustrated in Fig. 5 primarily in eliminating the keel 52 and providing instead thereof a second blade 53 in addition to the blade 54 on the spindle 55. Furthermore, the spindle 55 will have its noses or loops 56 and 57 extending radially from the spindle 55 at different points so that the blades 53 and 54 may be caused to rotate in opposite directions to one another. By the use of such additional blade 53 or the like means, functioning as a brake, it is thus possible to dispense with the keel, such as the keel 52 shown in Fig. 5. In this manner the blades 53 and 54 in a way oppose one another in their tendency to rotate the spindle 55 with them. Obviously in turn, instead of two, there may be any number of blades to produce this equilibrium or this neutralizing effect.

It is obvious that various changes and modifications may be made to the details of construction without departing from the general spirit of the invention as set forth in the appended claims.

I claim:

1. A fish lure to be connected intermediate a hook member and a line, said lure having a stem, such lure having a fixed keel on said stem, a blade rotatably and pivotally mounted on said stem, the outer face of said blade being inclined away from said stem to receive the impact of the water when moving relative to said water, and a device for changing the direction of rotation of said blade relative to said stem for clockwise and counterclockwise movement of said blade relative to said stem, said device including a first abutment on said stem and a second abutment on said blade, the abutment on said stem disposed in the path of movement on said blade when said blade rotates about said stem, and cam means intermediate said blade and stem cooperating with said abutments to change the pitch of said blade.

2. A fish lure to be connected intermediate a hook member and a line, said lure having a stem, said stem having a keel and a first abutment, said keel and first abutment being immovable with respect to said stem, a blade, a bracket rotatably and pivotally mounted on said stem and pivotally connected to said blade, and a second abutment and a third abutment on said blade, said first abutment being disposed in the path of movement of said second abutment to deflect said blade, said third abutment having two faces, one face to engage said stem to deflect the pitch of said blade for clockwise movement relative to said stem when said second abutment engages one side of said first abutment to deflect said blade in one direction, and the other face of said third abutment to engage said stem to deflect the pitch of said blade for counter-clockwise movement relative to said stem.

3. The combination as set forth in claim 2 in which a wire finger connected to said stem constitutes said first abutment.

4. The combination as set forth in claim 2 in which an offset is formed in said stem to constitute said first abutment.

5. The combination as set forth in claim 2 in which a first wire bridge constitutes said second abutment, and a second wire bridge having an offset therein constitutes the third abutment, and the opposite faces of said offset constitute the two faces of said third abutment.

6. The combination as set forth in claim 2 in which a finger bent from said blade constitutes the second abutment, and a plate projection bent from said blade having a nose projecting from the end thereof constitutes the third abutment and the opposite faces of said nose constitute the two faces of said third abutment.

7. The combination as set forth in claim 2 in which a U-shaped plate having openings in its legs to receive said stem constitutes said bracket, and one of said latter legs is pivotally connected to said blade to pivotally connect said blade to said bracket.

8. The combination as set forth in claim 2 in which a U-shaped plate having openings in its legs to receive said stem constitutes said bracket, and said blade has an opening therein through which said U-shaped plate extends to pivotally connect said blade to said bracket.

9. A fish lure to be connected intermediate a hook member and a line, such lure having a spindle, a first blade rotatably and pivotally mounted on said spindle, a brake mounted on said spindle to counteract the tendency of the spindle to rotate with said first blade, and a device for changing the direction of rotation of said first blade relative to said spindle for clockwise and counterclockwise movement of said first blade relative to said spindle said device including a first abutment on said spindle and a second abutment on said blade, the abutment on said spindle disposed in the path of movement of the abutment on said blade when said blade rotates about said spindle, and cam means intermediate said blade and spindle cooperating with said abutments to change the pitch of said blade.

10. The combination as set forth in claim 9 in which said brake consists of a second blade and a device for changing the pitch of said second blade relative to said spindle for rotation in a direction opposite to that of said first blade.

11. A fish lure to be connected intermediate a hook member and a line, said lure having a stem, means fixed on said stem including a plurality of opposing abutment faces, and a blade rotatably mounted on said stem and having an abutment, the outer face of said blade being inclined away from said stem to receive the impact of the water when moving relative to said water, certain of said opposing abutment faces cooperating with the water to maintain said means in position relative to said blade, and other of said opposing abutment faces being in the path of movement of the abutment on said blade when said blade rotates about said stem, and cam means intermediate said blade and stem cooperating with said latter opposing abutment faces to change the pitch of the blade in turn to change the direction of rotation of said blade relative to said stem for clockwise or counterclockwise movement of said blade relative to said stem.

PETER J. PERO.

References Cited in the file of this patent

UNITED STATES PATENTS

| Number | Name | Date |
|---|---|---|
| 289,508 | Dawson | Dec. 4, 1883 |
| 989,869 | Pflueger | Apr. 18, 1911 |
| 1,620,972 | Hobbs | Mar. 24, 1927 |
| 2,277,350 | Phillips | Mar. 24, 1942 |
| 2,482,648 | Brandt | Sept. 20, 1949 |